Sept. 1, 1953
C. C. DUBBS
2,650,412
METHOD OF MOLDING CONCRETE PRODUCTS
Filed Oct. 17, 1949
3 Sheets-Sheet 1
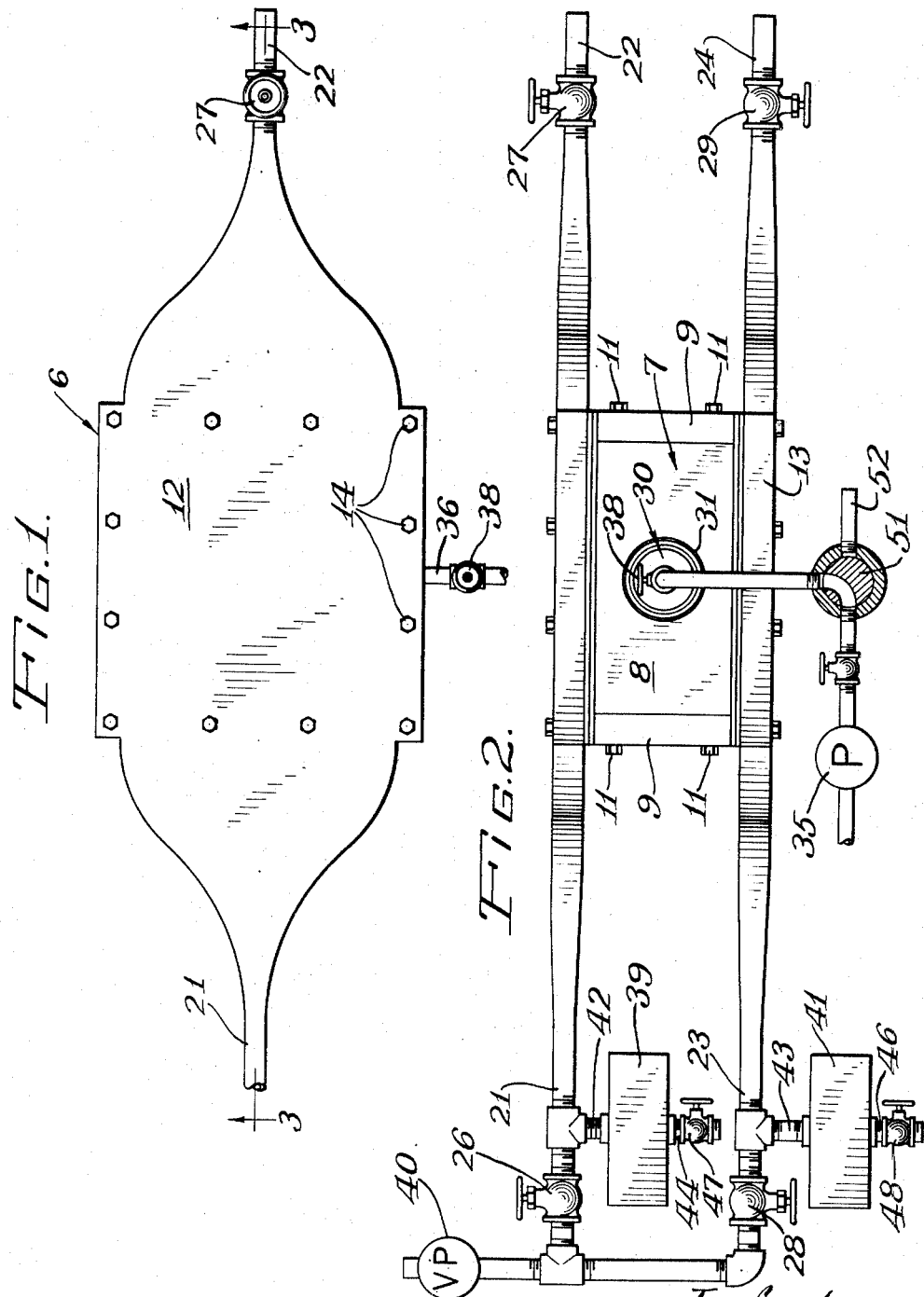
Inventor:
Carbon C. Dubbs
By Lee J. Gary
Attorney

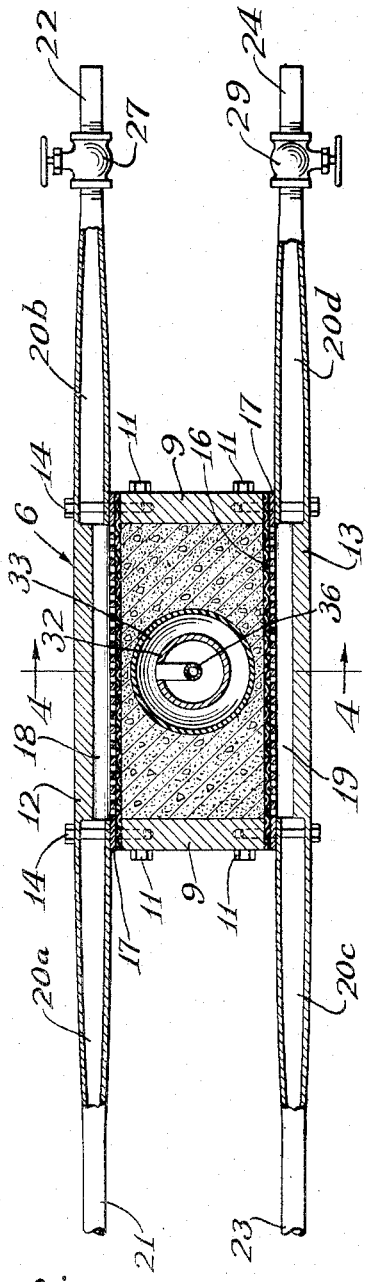
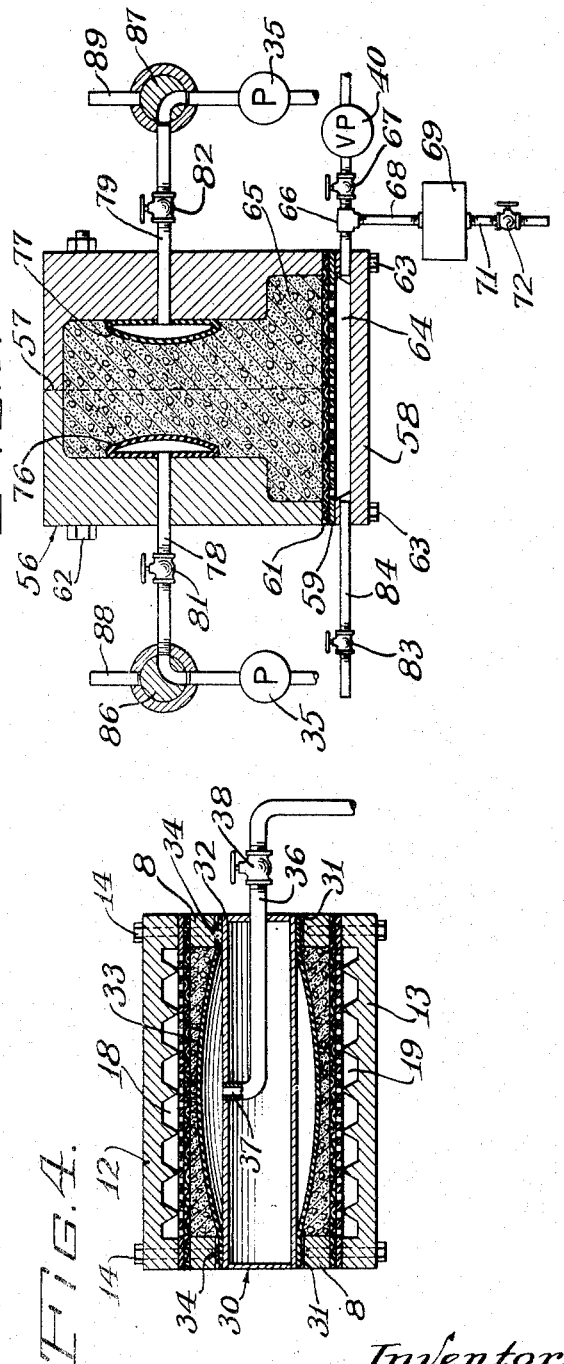

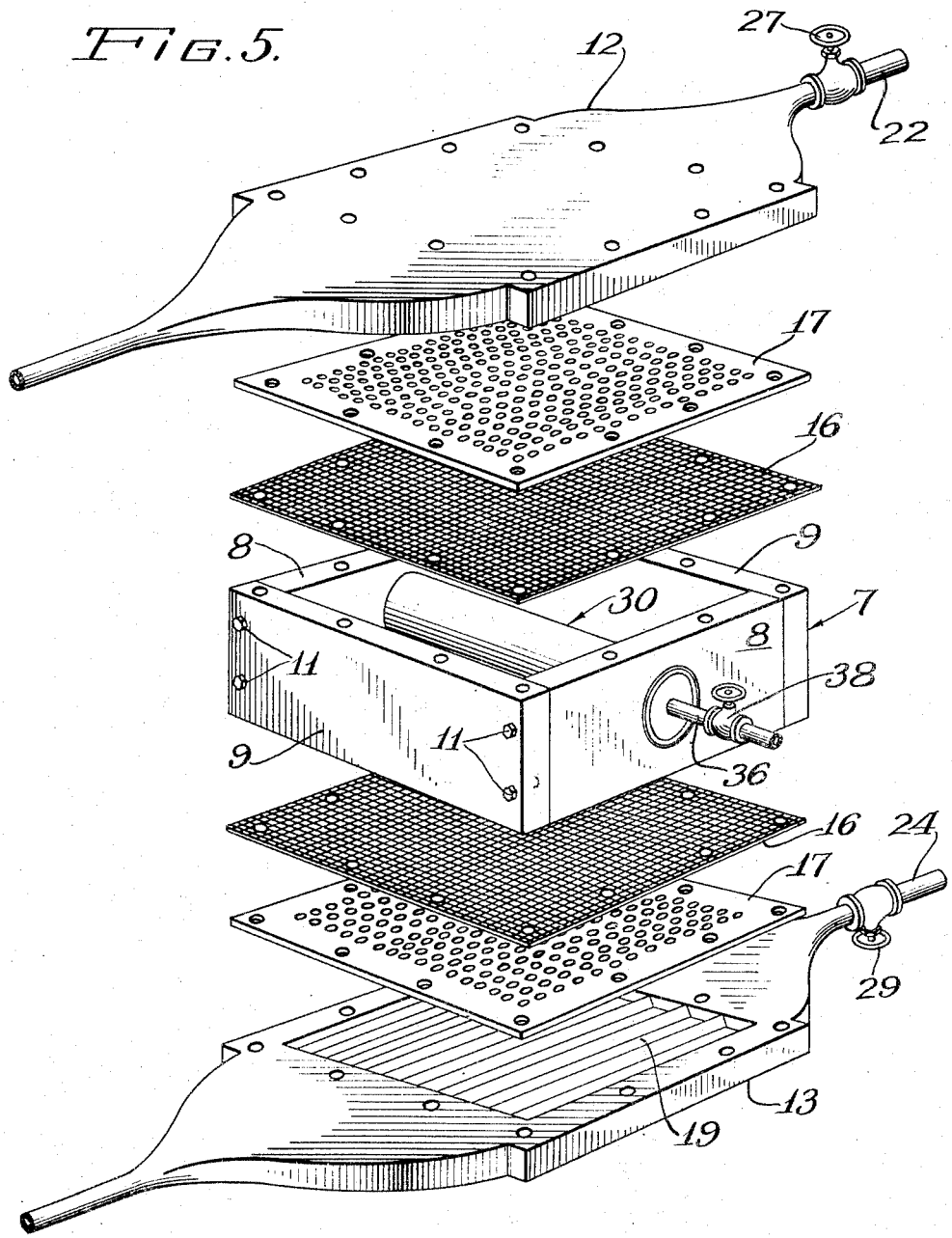

Patented Sept. 1, 1953

2,650,412

UNITED STATES PATENT OFFICE 2,650,412

METHOD OF MOLDING CONCRETE PRODUCTS

Carbon Chatley Dubbs, Orange, Calif.

Application October 17, 1949, Serial No. 121,802

3 Claims. (Cl. 25—155)

This invention relates to a method of molding concrete products, and is more particularly concerned with the provision of a method suitable for use in the manufacture of concrete products, such as building blocks, slabs, beams, posts, etc.

Manufacturers have heretofore employed two methods in forming concrete products; one method employing the use of a relatively dry concrete mix, and the other method embodying the use of a relatively wet concrete mix. The dry pack method consists in consolidating a very dry concrete mix within a mold by ramming and/or vibration and then ejecting the product from the mold to permit immediate reuse of the mold. The dry pack method has certain inherent disadvantages in that the product has approximately 25% voids which tend to materially decrease the physical properties of the product, the mold must be left open at one end and the excess concrete removed from said open end prior to ejection of the product from the mold, the concrete product has a tendency to slump after its removal from the mold if the mix is not very accurately controlled, the molded product is limited to one finished surface, and the size and shape of the product is definitely limited due to the method of molding.

In molding a very fluid concrete mix, it has heretofore been the practice to pour the mix into a mold and then permit the concrete to harden within the mold. This method has heretofore been used for forming concrete joists, some types of concrete pipe, statuary, etc. This method of molding a wet concrete mix has certain inherent disadvantages in that the mix has a high water-cement ratio which reduces the compressive strength of the material, causes undesirable shrinkage, checking, cracking, and crazing. Concrete with a high water-cement ratio also has a tendency to dust and is high in water absorption since the excess water which is not necessary for chemical reaction of the cement resides temporarily within the concrete causing bubbles and canals therethrough. A further disadvantage inherent in the relatively wet concrete mix method is that the molded product cannot be removed from the mold until the concrete has had sufficient time to set, which period may run from several hours to a full day. Even in applying a vacuum alone to the outer surface of the concrete it would take a long period of time to withdraw sufficient excess water out so that the concrete could be removed from the mold and it would still retain an excess of water as the mineral aggregate would not be compacted as it is when water is squeezed out by internal pressure.

The present method contemplates the use of a relatively wet concrete mix in which it is not essential to closely control the water-cement ratio, the mix being sufficiently fluid to facilitate handling, transportation and, when poured into a mold, will readily assume the shape of the interior of the mold. After the relatively wet mix is poured into a mold, internal pressure is applied inside of the mix to force the mix to all parts of the inner surface of the mold and to compact the mixture and at the same time to force out excess water through suitable filters arranged within the walls of the mold. It has been found that by thus expressing the excess water from the mix within the mold, a majority of the water-voids are closed up, thereby producing a product having greater strength and less absorption, shrinkage and wear. In other words, the method hereinafter described consists in removing the excess water from the mix within the mold prior to initial set of the concrete in order to improve the physical properties of the concrete product, and to also cause the mix to reach a "no-slump" consistency for immediate removal from the mold.

This invention further contemplates the provision of a method in which internal pressure is applied to the mix within a mold to express excess water from the mix through filters provided within the walls of the mold, the mold being formed with vacuum chambers outside the filter screens to receive the excess water from the mix and to prevent the excess water from reentering the mix when the internal pressure within the mix is relieved. The excess water is removed from the vacuum chamber prior to reduction of the internal pressure within the mix.

Products manufactured by the method hereinafter set forth are accurate to the dimensions of the mold, have a controllable and predetermined surface finish, are relatively free of surface dusting, shrinkage, cracks and surface crazing, are compact, uniform and substantially free of voids. Products manufactured by the method hereinafter set forth are so highly compacted prior to initial set that they can be immediately removed from the mold without appreciable change of shape or size.

This invention further contemplates the provision of a process wherein the concrete mix is in a highly fluid state in order that it may be placed in the mold without vibration and still fill restricted voids within the mold, the mix being sufficiently fluid to permit pumping, pouring or otherwise handling as a fluid.

This invention further contemplates the provision of a process wherein any reasonable variation in the volume of the concrete mix placed in a mold will be compensated for without damage to the physical properties or appearance of the finished product.

This invention further contemplates the provision of a process wherein the density, compactness and water-cement ratio of the concrete mix may be varied at will without materially affecting the quality of the product.

This invention embodies other novel features, details of construction and arrangement of parts which are hereinafter set forth in the specification and claims, and illustrated in the accompanying drawings, wherein:

Fig. 1 is a top plan view illustrating a molding apparatus embodying features of the present invention.

Fig. 2 is a side elevational view of same.

Fig. 3 is a longitudinal sectional view taken along the line 3—3 of Fig. 1.

Fig. 4 is a transverse sectional view taken along the line 4—4 of Fig. 3.

Fig. 5 is a perspective explosion view illustrating the construction and arrangement of parts embodied in the molding apparatus.

Fig. 6 is a transverse sectional view illustrating a modified form of molding apparatus.

Referring now to the drawings for a better understanding of this invention, the molding apparatus is shown as comprising a mold 6 having a body 7 formed of two side plates 8—8 and two end plates 9—9, the end plates being secured to the side plates by means of cap screws 11. Top and bottom covers 12 and 13, respectively, are secured to opposite faces of the body 7 by means of cap screws 14. Interposed between each cover and the body 7 is provided a relatively fine mesh filter screen 16 and an apertured plate 17, the filter screens 16—16 being disposed adjacent the mold body 7 and the apertured plates 17—17 being disposed adjacent their respective covers.

The covers 12 and 13 are recessed on their inner faces to form vacuum chambers 18 and 19, respectively. Passageways 20a and 20b lead outwardly through the ends of the cover 12 from the vacuum chamber 18 to conduits 21 and 22. Passageways 20c and 20d are also formed in the cover 13 to lead outwardly from the vacuum chamber 19 to communicate with conduits 23 and 24. Valves 26 and 27 are interposed in the conduits 21 and 22, respectively. Valves 28 and 29 are interposed in the conduits 23 and 24, respectively.

Core openings 31—31 are formed in the side walls 8—8 of the mold body 7 to snugly receive the ends of a core 30. The core 30 comprises a cylindrical mandrel 32 and a sleeve 33 of resilient material, such as rubber, is mounted over the mandrel 32 and securely engaged thereto at its ends by means of locking bands 34. The locking bands 34 are adapted to provide an air-tight engagement between the sleeve 33 and the mandrel 32. A conduit 36 leads inwardly through one end of the mandrel 32 and thence laterally at 37 to the surface of the mandrel to direct air or fluid into the space between the sleeve and the mandrel to inflate and expand the sleeve 33. During expansion of the sleeve 33, it acts to engage the surfaces defining the openings 31—31 and thus serves as a seal to prevent the concrete from leaking out of the mold. The conduit 36 leads to a suitable source of air or fluid under pressure, such as an air compressor or pump 35, and is provided with a suitable control valve 38. It is contemplated that any number of mandrels 32 and sleeves 33 may be employed, and that they may be of any practical shape.

Conduits 21 and 23 are adapted to be connected to a suitable vacuum pump 40; while the conduits 22 and 24 lead to the atmosphere. Water accumulators 39 and 41 are connected to their respective conduits 21 and 23 by means of conduits 42 and 43, respectively. The water accumulators 39 and 41 are provided with drain conduits 44 and 46, respectively, controlled by valves 47 and 48, respectively.

In the manufacture of concrete products in a molding apparatus of the type thus shown and described, a relatively wet concrete mix is placed within the body of the mold and the cover 12 is then secured in position to close the mold. The valve 38 in the conduit 36 is opened to permit compressed air or fluid under pressure to enter the space between the mandrel 32 and sleeve 33 to cause the sleeve to expand. During expansion of the sleeve 33, it first acts to seal itself against the walls of the openings 31. The mold is then filled with the concrete mix and the sleeve is then further expanded to exert internal pressure against the concrete mix within the mold. As the sleeve expands it expresses excess water from the concrete mix, the excess water passing toward and through the filter screens 16—16 and apertured plates 17—17 into the vacuum chambers 18 and 19. The major portion of the water within the vacuum chambers 18 and 19 is caused to flow outwardly by gravity through the conduits 21 and 23 and thence through the conduits 42 and 43 into the water accumulators 39 and 41. The valves 26 and 28 in the conduits 21 and 23, respectively, are then opened to permit the vacuum pump 40 to remove any remaining excess water from the vacuum chambers 18 and 19.

It will, of course, be apparent that the internal pressure exerted by the sleeve 33 against the concrete mix or the number of sleeves and mandrels employed may be varied depending upon the amount of excess water which is to be removed from the mix and the length of time employed during the molding operation. By setting up an internal pressure within the mold by means of one or more expansible sleeves, it will be noted that the concrete mix will be forced into all the corners and other restricted portions of the mold to insure a smooth exterior appearance for the finished product. It will also be apparent that the internal pressure exerted by the inflatable sleeve 33 acts to reduce the voids within the concrete mix to a minimum, thereby producing a product having improved physical properties.

After the excess water has been removed from the concrete mix by the expansible sleeve 33 and the vacuum condition later created within the vacuum chambers 18 and 19, the valves 26 and 28 are closed, and the valves 27 and 29 are opened. A three-way valve 51 leading to the atmosphere through a conduit 52 is then opened to deflate the sleeve 33 to permit the core 30 to be withdrawn from the mold. The cover 13 and its respective filter screen 16 and apertured plate 17 are then removed from the mold and replaced by a suitable pallet (not shown). The rest of the mold is then disassembled and the concrete product is removed on the pallet.

Referring now more particularly to Fig. 6 in the drawings, a modified form of molding apparatus is shown as comprising a split mold 56 divided along the line 57. The mold 56 is provided with a cover 58, an apertured plate 59 and a filter screen 61 to close one face of the mold. The two sections of the mold 56 are secured together by any suitable means, such as bolts 62, and the cover 58 is secured to the mold by means of cap screws 63. The cover 58 is formed with a vacuum chamber 64 to receive excess water from the concrete mix 65. A vacuum condition is created within the vacuum chamber 64 by means of a suitable vacuum pump 40 which communicates with the vacuum chamber through a conduit 68 controlled by a valve 67. The major portion of the excess water is adapted to flow by gravity from the vacuum chamber 64 through a conduit 66 and thence through the conduit 68 into a water accumulator 69. A conduit 71 normally closed by a valve 72 leads from the water accumulator 69 to the atmosphere. A conduit 84 provided with a control valve 83 leads from the vacuum chamber 64 to the atmosphere. A pair of inflatable rubber tubes 76 and 77 are disposed in opposing relation against opposite side walls of the mold 56. The tubes 76 and 77 are inflated by means of compressed air or fluid passing through conduits 78 and 79, respectively, under the control of valves 81 and 82, respectively. During expansion of the tubes 76 and 77 an internal pressure condition is created within the relatively wet concrete mix 65 to express the excess water through the filter screen 61 and apertured plate 59 into the vacuum chamber 64 and thence through the conduits 66 and 68 into the water accumulator 69. After the excess water has thus been removed from the concrete mix 65, any excess water remaining within the vacuum chamber 64 or upon the filter screen, the concrete surface adjacent the filter screen or the apertured plate is removed from the interior of the mold by opening the valve 67 in the conduit 66 leading to the vacuum pump 40. After the excess water has been removed from the concrete mix and the mold, the valve 67 in a conduit 66 leading from the vacuum chamber 64 to the vacuum pump 40 is closed, then a valve 83 in a conduit 84 leading from the vacuum chamber 64 to the atmosphere is opened. A pair of three-way valves 86 and 87 in the conduits 78 and 79, respectively are then operated to permit air or fluid within the tubes 76 and 77 to pass outwardly to the atmosphere through conduits 88 and 89. The concrete product is then removed from the mold 56 by removing the cap screws 63 and bolts 62. The two sections of the mold 56 may then be moved laterally away from each other.

The type of mold illustrated in Figs. 1 to 5 in the drawings is particularly adapted for use in forming concrete blocks or other products requiring a relatively smooth exterior surface of predetermined dimensions. The molding apparatus illustrated in Fig. 6 in the drawings is particularly suitable for use in molding concrete posts, joists, slabs, and the like in which it is not essential to provide uniform exterior surfaces to exact dimensions.

While this invention has been shown in but two forms, it is obvious to those skilled in the art that it is not so limited but is susceptible of various changes and modifications without departing from the spirit and scope of the claimed invention.

I claim as my invention:

1. The method of molding a concrete product which comprises introducing a relatively liquid concrete mix containing cement, aggregate and a liquid into a closed mold, said mix in the mold being relatively flowable and carrying occluded and dissolved air uniformly distributed throughout its mass, applying pressure by means of a fluid interiorly of the mix in the mold to move the solid components of the mix into substantial contiguity to compact and densify the mix within the mold and to position said mix against all the surfaces of the mold and to expel liquid from the mix at a surface of the mix, maintaining said fluid out of contact with said mix, and establishing a sub-atmospheric pressure upon a surface of the mix while maintaining the application of said fluid pressure to remove said uniformly distributed air in company with entrained liquid which was not removed from the interstices between the substantially contiguous components of the mix by said fluid pressure applied to the mix.

2. The method of molding a concrete product which comprises introducing a relatively liquid concrete mix containing cement, aggregate and a liquid into a closed mold, said mix in the mold being relatively flowable and carrying occluded and dissolved air uniformly distributed throughout its mass, applying superatmospheric pressure by means of a fluid to a predetermined portion of the mix in the mold to move the solid components of the mix into substantial contiguity to compact and densify the mix within the mold and to position said mix against all of the defining surfaces of the mold and to expel liquid from the mix at a surface of the mix, maintaining said fluid out of contact with said mix, and establishing a subatmospheric pressure upon a surface of a portion of the mix different from said predetermined portion of the mix to which said fluid pressure is applied while said fluid pressure is being maintained upon the mix to remove said uniformly distributed air in company with entrained liquid which was not removed from the interstices between the substantially contiguous components of the mix by said fluid pressure applied to the interior of the mix.

3. The method of molding a concrete product which comprises introducing a relatively liquid concrete mix containing cement, aggregate and a liquid into a closed mold having a core interiorly thereof, said mix in the mold being relatively flowable and carrying occluded and dissolved air uniformly distributed throughout its mass, applying superatmospheric pressure by means of a fluid to an interior surface of the mix in the mold to move the solid components of the mix into substantial contiguity to compact and densify the mix within the mold and to position said mix against all the surfaces of the mold and to expel liquid from the mix at an exterior surface of the mix, maintaining said fluid out of contact with said mix, and establishing a subatmospheric pressure upon an exterior surface of the mix while said fluid pressure is being maintained upon the mix to remove said uniformly distributed air in company with entrained liquid which was not removed from the interstices between the substantially contiguous components of the mix by said fluid pressure applied to the interior surface of the mix.

CARBON CHATLEY DUBBS.

References Cited in the file of this patent

UNITED STATES PATENTS

| Number | Name | Date |
|---|---|---|
| 1,492,642 | Lake | May 6, 1924 |
| 1,552,064 | Lake | Sept. 1, 1925 |
| 1,846,279 | Speirs | Feb. 23, 1932 |
| 2,026,940 | Hendryx | Jan. 7, 1936 |
| 2,046,867 | Billner | July 7, 1936 |
| 2,052,818 | Freyssinet et al. | Sept. 1, 1936 |
| 2,175,715 | Denning | Oct. 10, 1939 |
| 2,311,358 | Baily | Feb. 16, 1943 |
| 2,528,643 | Dubbs | Nov. 7, 1950 |